(12) United States Patent
Wilhite

(10) Patent No.: US 7,559,274 B2
(45) Date of Patent: Jul. 14, 2009

(54) BEVERAGE MAKING DEVICES AND METHODS WITH AN INNER HOUSING IN PLACE OF A CENTRAL ROD PLUNGER

(76) Inventor: Robert Wilhite, 1800 Pacific Ave., Venice, CA (US) 90291

( * ) Notice: Subject to any disclaimer, the term of this patent is extended or adjusted under 35 U.S.C. 154(b) by 656 days.

(21) Appl. No.: 11/303,841

(22) Filed: Dec. 15, 2005

(65) Prior Publication Data
US 2007/0137494 A1      Jun. 21, 2007

(51) Int. Cl.
*A47J 31/06* (2006.01)
*A47J 31/20* (2006.01)

(52) U.S. Cl. .............................. 99/297; 99/287; 426/433

(58) Field of Classification Search .................... 99/297, 99/287, 302 P, 279; 426/433
See application file for complete search history.

(56) References Cited

U.S. PATENT DOCUMENTS

| | | | |
|---|---|---|---|
| 376,319 A * | 1/1888 | Lane | 99/297 |
| 2,749,834 A * | 6/1956 | Hiscock | 99/287 |
| 3,020,823 A * | 2/1962 | Musso | 99/287 |
| 3,324,787 A * | 6/1967 | McCleary | 99/319 |
| 4,650,583 A | 3/1987 | Bondanini | |
| 5,880,441 A * | 3/1999 | Hartman et al. | 219/689 |
| 5,979,299 A | 11/1999 | Hornsby et al. | |
| 6,038,963 A * | 3/2000 | Patterson et al. | 99/287 |
| 6,240,833 B1 | 6/2001 | Sham et al. | |
| 6,422,133 B1 | 7/2002 | Brady | |
| 6,964,223 B2 * | 11/2005 | O'Loughlin | 99/297 |

\* cited by examiner

*Primary Examiner*—Reginald L Alexander
(74) *Attorney, Agent, or Firm*—Foley & Lardner LLP

(57) ABSTRACT

A beverage making device for making a beverage from a liquid and a beverage making material includes an outer housing, an inner housing, and a filter member. The outer housing is configured to hold a mixture of the liquid and the beverage making material. The inner housing is configured to be received within the outer housing and is configured to slide within the outer housing. The filter member has at least an outer peripheral edge coupled to the inner housing, and the filter member is configured to filter the mixture to provide the beverage as the inner housing slides within the outer housing. The beverage making device may further include a wiper gasket coupled to an outer peripheral edge of the inner housing that wipes an inner surface of the outer housing as the inner housing slides within the outer housing.

13 Claims, 15 Drawing Sheets

BEVERAGE MAKING DEVICES AND METHODS WITH AN INNER HOUSING IN PLACE OF A CENTRAL ROD PLUNGER

BACKGROUND OF THE INVENTION

1. Field of the Invention

Embodiments of the present invention relate generally to beverage making devices and methods and, in specific embodiments, to a beverage making device comprising an outer housing for holding a mixture of a liquid and a beverage making material, an inner housing configured to be received within the outer housing and configured to slide within the outer housing, and a filter member having at least an outer peripheral edge coupled to the inner housing, where the filter member is configured to filter the mixture to provide a beverage as the inner housing slides within the outer housing.

2. Related Art

Beverage making devices, such as French press beverage makers, press pots, and the like, have been in use for several decades and are extremely popular among many coffee and tea aficionados. Traditional press pots allow for filtering a mixture of a liquid and a beverage making material using a central rod plunger in order to provide a filtered beverage. However, various problems may arise when using traditional press pots, such as: (i) unfiltered portions of the beverage making material may escape into the filtered beverage; (ii) the filtered beverage may lose its temperature quickly due to poor insulation; and (iii) it may take a long time to clean a residue of the beverage making material off of walls of a container of a press pot after serving the filtered beverage.

FIG. 1 illustrates a configuration of a traditional press pot 10 comprising a container 16, a plunger assembly 20, and a lid 30. The plunger assembly 20 comprises a rod 22 and a filter 24. The rod 22 is attached to the filter 24 at a center of the filter 24, and the rod 22 is not attached to any outer peripheral edge of the filter 24. When making a beverage 47 with the traditional press pot 10, a beverage making material, such as coffee grinds, tea leaves, or the like is placed into the container 16, and then a liquid, such as boiling water or the like, is poured into the container 16 to provide a mixture 45 of the liquid and the beverage making material. Then, the mixture 45 of the liquid and the beverage making material is filtered by the filter 24 as a downward pressure is applied to the rod 22, so as to provide the beverage 47. The beverage 47 may then be poured out of a spout 52 of the container 16 in order to serve the beverage 47.

Examples of related art press pots are disclosed in the following references: (i) U.S. Pat. No. 4,650,583 entitled "Infusion Filter", the contents of which are incorporated by reference herein; (ii) U.S. Pat. No. 5,979,299 entitled "Beverage Infusion Making Apparatus", the contents of which are incorporated by reference herein; (iii) U.S. Pat. No. 6,240,833 entitled "Automatic French Press Beverage Maker", the contents of which are incorporated by reference herein; and (iv) U.S. Pat. No. 6,422,133 entitled "French Press Coffee Maker with Assembly to Reduce Contact of Grounds with Liquid Coffee after Termination of Steeping Period", the contents of which are incorporated by reference herein.

In the related art press pots, the only support for a filter or strainer is a central rod that is attached at a center of the filter. When using press pots that have a filter supported only at a center by a central rod, various problems may be encountered, such as the filter being misaligned when inserted into a container, the plunging rod slipping sideways when pressure is applied to the rod, the filter wiggling around in the container when pressure is applied to the rod, and the like.

If a filter that is connected to a central rod is put in crooked or is misaligned within a container of a traditional press pot, unfiltered beverage making material may escape around a side of the filter and contaminate a filtered beverage. Similarly, if the filter wiggles around in the container when a downward pressure is applied, more unfiltered beverage making material may escape around the side of the filter and contaminate the filtered beverage. In addition, if a lid is not placed on the container of the press pot, and the plunging rod slips sideways when a downward pressure is applied, then a mixture of a liquid and the beverage making material may splatter out of the container.

FIG. 2 illustrates a problem with the traditional press pot 10 when the plunger assembly 20 is misaligned as it is placed into the container 16. The rod 22 of the plunger assembly 20 is placed through the lid 30 and is attached at a center of the filter 24. As illustrated in FIG. 2, when the filter 24 is inserted into the container 16, the filter 24 may be misaligned such that the filter 24 is tilted with respect to the container 16. The misalignment of the filter 24 allows the unfiltered mixture 45 of the liquid and the beverage making material to escape around an edge of the filter 24 and to contaminate a provided beverage. For example, if the beverage making material comprises coffee grinds, then some of the unfiltered coffee grinds may escape into the filtered coffee, and the coffee would then be served with a residual sludge or grit of the coffee grinds.

A further disadvantage with traditional press pots is that a filtered beverage that is desired to be served hot may get lukewarm or cold when sitting in a container or brewing chamber of a press pot that is not insulated. For example, if a container of a press pot is made of glass and filtered coffee in the press pot contacts the glass, then the coffee may quickly become lukewarm or cold due to a lack of insulation with respect to the container. Thus, a filtered beverage that is desired to be served hot may lose its temperature quickly in traditional press pots. Some related art press pot designs attempt to solve the insulation problem by adding insulation to the press pots, but such designs have increased costs and may not be cost effective.

A yet further disadvantage of traditional press pots is that it may be tedious and time consuming to clean the press pots after serving a filtered beverage. For example, a residue of a beverage making material may remain on a side wall of a container of a traditional press pot after use, and the residue may harden, which may increase a time required to clean the container. Also, it may be time consuming to disassemble a filter from a plunging rod in order to clean the filter in the traditional press pots.

Another disadvantage of traditional press pots is that they are typically made from expensive materials, such as metal and glass, which increases a cost of production. As a consequence, a retail price for the manufactured traditional press pots may not be reasonable to end consumers.

In light of the above mentioned problems, there is a need for beverage making devices and methods that allow for reducing a likelihood that a plunger will slip or tilt when pressure is applied and, thus, reduce a likelihood that a beverage will splatter out of the beverage making device or that a filtered beverage will be contaminated with unfiltered beverage making material. Also, there is a need for beverage making devices and methods that allow for keeping a filtered beverage warm before it is served, that allow for easy cleaning of a container and a filter after a beverage is served, and that permit the use of inexpensive materials in the manufacturing of the beverage making devices.

SUMMARY OF THE DISCLOSURE

Embodiments of the present invention relate to a beverage making device with an inner housing in place of a traditional central rod plunger. The inner housing may support a filter on at least an outer peripheral edge of the filter, rather than only in a center of the filter. Such a beverage making device may reduce a likelihood that a beverage will splatter out of the beverage making device, and may reduce a likelihood that a filtered beverage will be contaminated with unfiltered beverage making material. Also, such a beverage making device may allow for keeping a beverage warm for longer periods of time than with a traditional press pot, and may also be easier to clean and capable of being manufactured with less expensive materials than with a traditional press pot.

A beverage making device for making a beverage from a liquid and a beverage making material in accordance with a general embodiment of the present invention includes an outer housing, an inner housing, and a filter member. The outer housing is configured to hold a mixture of the liquid and the beverage making material. The inner housing is configured to be received within the outer housing and is configured to slide within the outer housing. The filter member has at least an outer peripheral edge coupled to the inner housing, and the filter member is configured to filter the mixture to provide the beverage as the inner housing slides within the outer housing.

In various embodiments, the outer housing is cylindrical with a closed bottom portion and an open top portion, the inner housing is cylindrical with an open top portion, and the filter member is coupled to a bottom portion of the inner housing. In some embodiments, the inner housing comprises solid walls for holding the beverage. Also, in some embodiments, the beverage making device further comprises a lid that is configured to cover the inner housing when the inner housing is placed within the outer housing.

In various embodiments, the filter member is clipped to the inner housing. In some embodiments, the filter member comprises a mesh filter. In various embodiments, the inner housing has a bottom surface that is configured with one or more openings, and the filter member is held next to the bottom surface of the inner housing. In further embodiments, the filter member comprises a bendable filter, where the bendable filter has a tab, and the filter is configured to be detached from the inner housing when the tab is pulled. In various embodiments, the inner housing has an open top portion, and the filter member is coupled to the inner housing at a bottom portion of the inner housing.

In some embodiments, the beverage making device further comprises a wiper gasket coupled to an outer peripheral edge of the inner housing. Also, in some embodiments, the wiper gasket extends around an entire perimeter of the inner housing on at least a portion of the inner housing, and the outer housing and the inner housing are configured with dimensions such that an entire outer surface of the wiper gasket that extends around the entire perimeter of the inner housing is in contact with the outer housing when the inner housing is placed within the outer housing. In further embodiments, the inner housing is cylindrical, and the wiper gasket is coupled to a bottom edge of the inner housing.

In various embodiments, the beverage making device further comprises a top gasket coupled to an outer peripheral edge of a top portion of the inner housing, and a wiper gasket coupled to an outer peripheral edge of a bottom portion of the inner housing. In further embodiments, the outer housing and the inner housing are configured with dimensions such that an outer surface of the top gasket and an outer surface of the wiper gasket are in contact with the outer housing when the inner housing is placed within the outer housing, and such that an air space exists between the outer housing and the inner housing and between the top gasket and the wiper gasket when the inner housing is placed within the outer housing.

In some embodiments, the outer housing comprises plastic, and the inner housing comprises plastic. Also, in some embodiments, the outer housing comprises at least one of glass, ceramic, metal, plastic, and the like, and the inner housing comprises at least one of glass, ceramic, metal, plastic, and the like.

A press pot for making a beverage from a liquid and a beverage making material in accordance with a general embodiment of the present invention comprises an outer housing, an inner housing, and a filter member. The outer housing is configured to hold a mixture of the liquid and the beverage making material, and the outer housing has an open top portion and a closed bottom portion. The inner housing is adapted to be received within the outer housing and is adapted to slide within the outer housing, and the inner housing is configured to support the filter member. The filter member is configured to filter the mixture to provide the beverage as the inner housing slides within the outer housing.

A method for making a beverage from a liquid and a beverage making material in accordance with a general embodiment of the present invention, is a method using a beverage making device, where the beverage making device comprises an outer housing, an inner housing, and a filter member having at least an outer peripheral edge coupled to the inner housing. The method comprises placing the liquid and the beverage making material into the outer housing to form a mixture of the liquid and the beverage making material, inserting a portion of the inner housing into the outer housing, and pressing on the inner housing to slide the inner housing down within the outer housing such that the filter member filters the mixture to provide the beverage.

In various embodiments, the method further comprises pouring the beverage out of the inner housing. In some embodiments, the beverage making device further comprises a wiper gasket coupled to an outer peripheral edge of the inner housing, and the method further comprises sliding the inner housing out of the outer housing, where the wiper gasket wipes an inner surface of the outer housing as the inner housing slides out of the outer housing. Also, in some embodiments, the inner housing comprises a protrusion for supporting the outer peripheral edge of the filter member, the filter member comprises a bendable filter having a tab, and the method further comprises pulling the tab of the filter member to separate the filter member from the inner housing.

Therefore, embodiments of the present invention allow for the use of an inner housing instead of a traditional central rod plunger in a press pot. Also, the inner housing can support a filter member on at least an outer peripheral edge of the filter member, which may improve alignment of the filter member and reduce tilting of the filter member with respect to an outer housing when the inner housing is placed within the outer housing. Moreover, gaskets may be provided on the inner housing to improve alignment and stability of the inner housing within the outer housing, to create an insulating air space between the inner housing and the outer housing, and to clean an inner surface of the outer housing. Furthermore, the inner housing and the outer housing may be manufactured using inexpensive materials, such as plastic and the like.

As a consequence, beverage making devices and methods in accordance with various embodiments of the present invention may reduce a likelihood that a beverage will splatter out of a beverage making device, and may reduce a likelihood that a filtered beverage will be contaminated with unfiltered beverage making material. Also, beverage making devices and methods in accordance with various embodiments of the present invention may allow for keeping a beverage warm for longer periods of time than with traditional press pots, and may also be easier to clean and capable of being manufactured with less expensive materials than with traditional press pots.

DETAILED DESCRIPTION OF PREFERRED EMBODIMENTS

Figure 1:
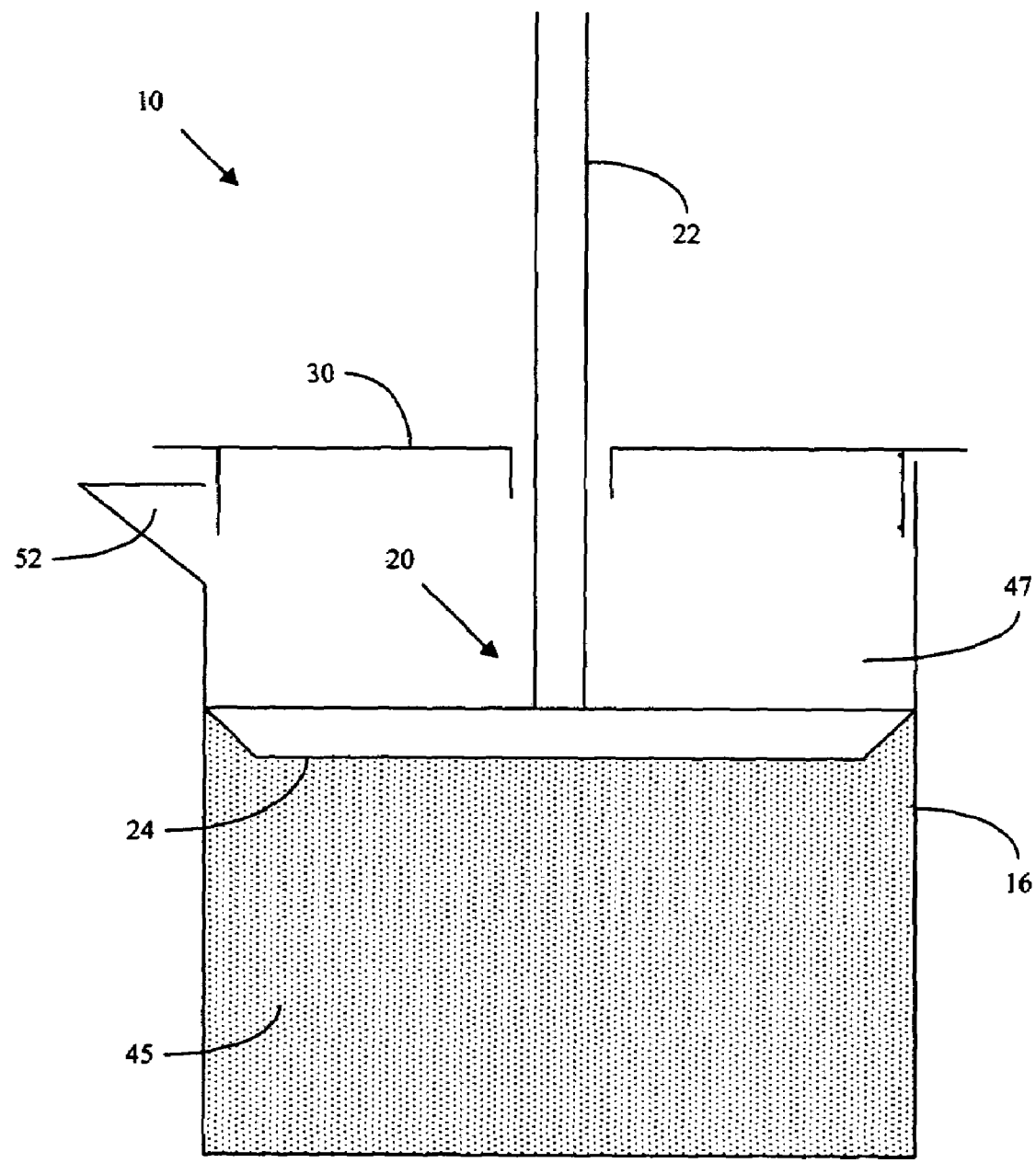
FIG. 1 illustrates a configuration of a traditional press pot with a plunger assembly having a central rod.
Figure 2:
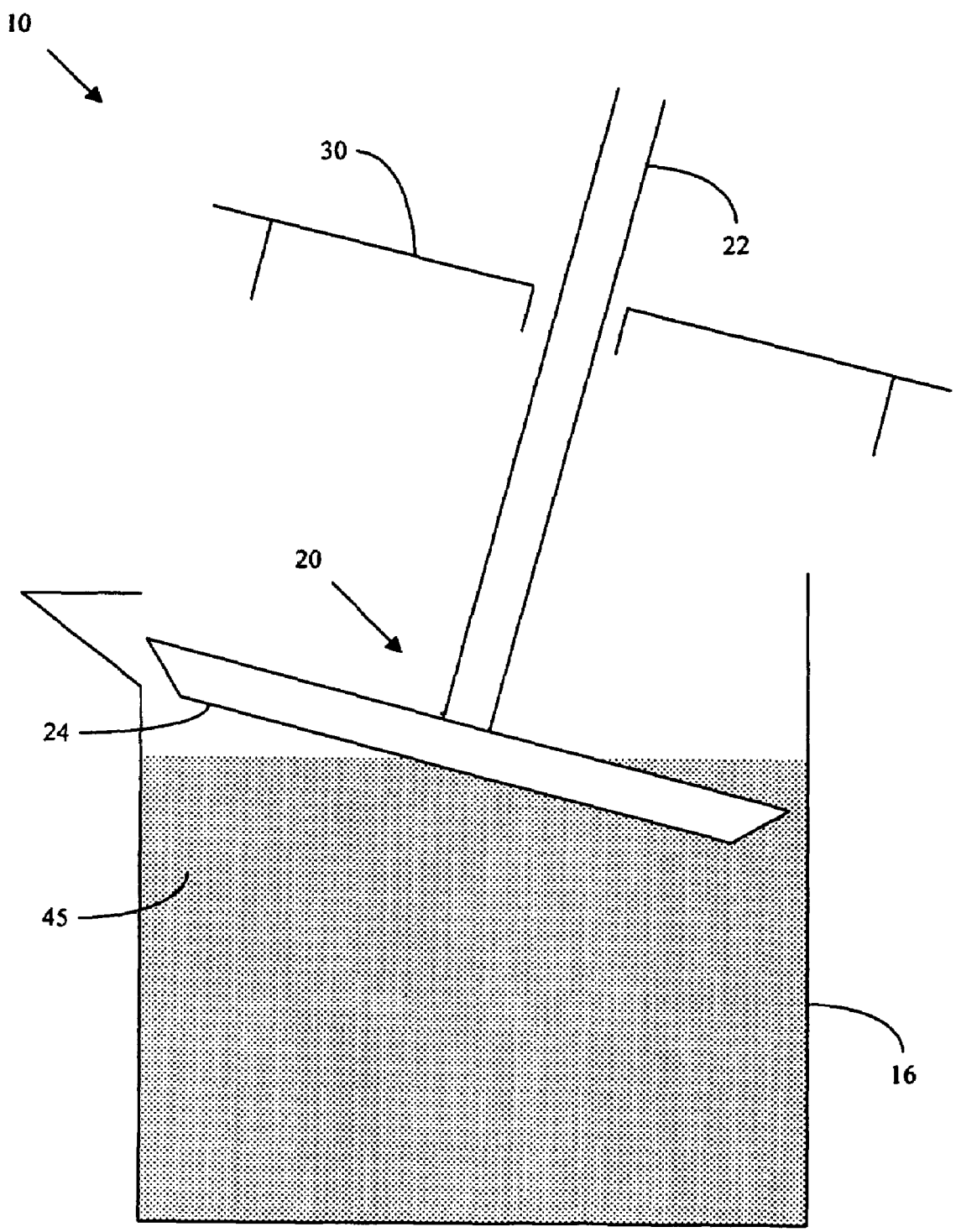
FIG. 2 illustrates a problem with a traditional press pot when a plunger assembly is misaligned as it is placed into a container.
Figure 3A:
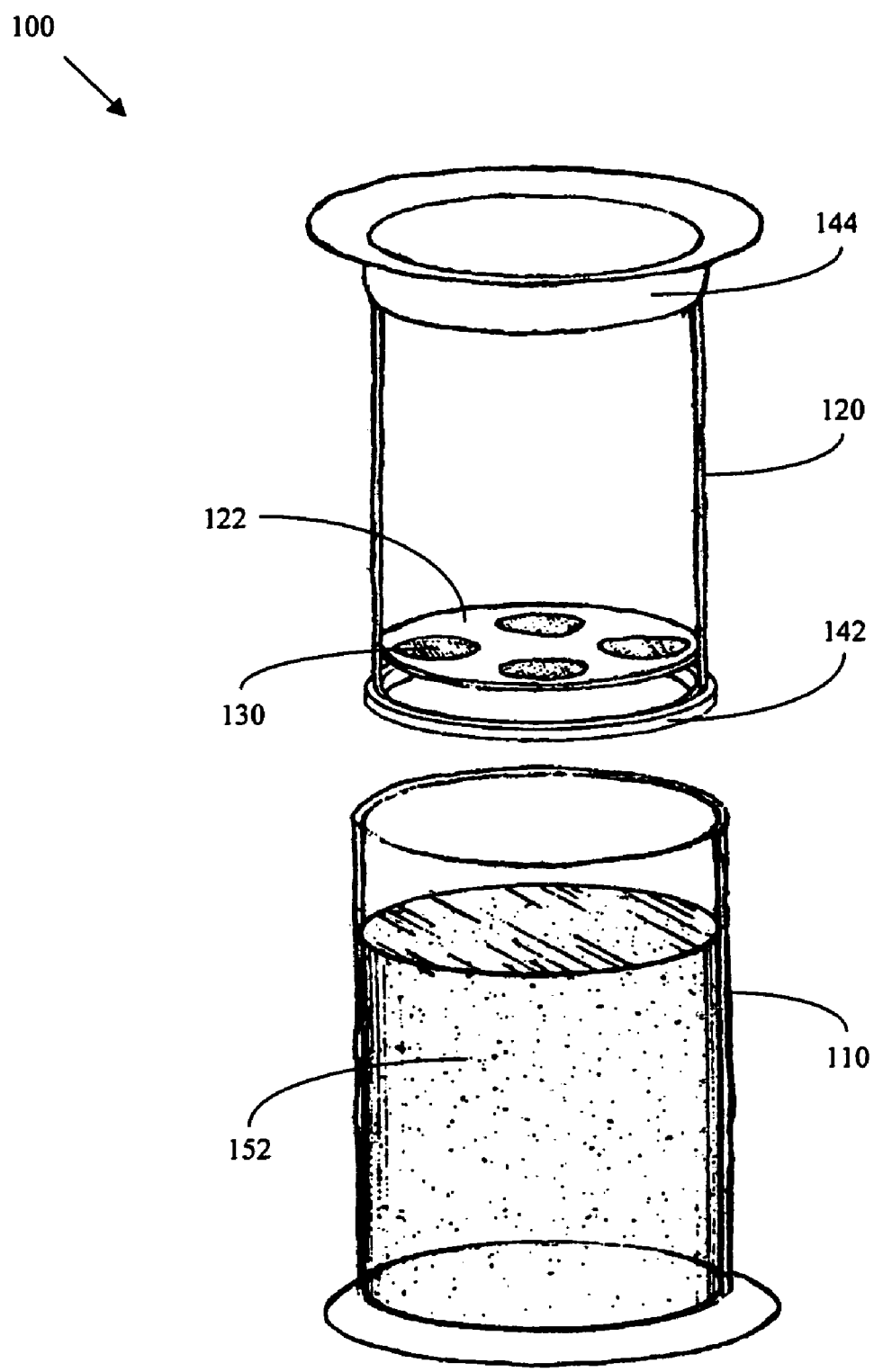
FIG. 3A illustrates a beverage making device in accordance with an embodiment of the present invention when an inner housing is removed from an outer housing.

FIG. 3A illustrates a beverage making device 100 in accordance with an embodiment of the present invention. The beverage making device 100 comprises an outer housing 110, an inner housing 120, and a filter member 130. In FIG. 3A, the inner housing 120 is shown as being separated from the outer housing 110. The beverage making device 100 may be, for example, a press pot, a French press beverage maker, or the like.

The beverage making device 100 allows for making a beverage from a liquid and a beverage making material. Examples of beverages include, but are not limited to, coffee, tea, and the like. Examples of liquids include, but are not limited to, water, milk, juice, and the like. Examples of beverage making materials include, but are not limited to, coffee grinds, coffee beans, tea leaves, and the like.

The outer housing 110 is configured to hold a mixture 152 of a liquid and a beverage making material. In the embodiment illustrated in FIG. 3A, the outer housing 110 is cylindrical with a closed bottom portion and an open top portion. However, the outer housing 110 is not limited to being cylindrical, but may be of other various shapes including, but not limited to, a three-dimensional ellipse, a three-dimensional twisted ellipse, a three-dimensional rectangular box, or the like. The outer housing 110 may be manufactured with various materials including, but not limited to, one or more of glass, ceramic, metal, plastic, and the like.

The inner housing 120 is configured to be received within the outer housing 110 and is configured to slide within the outer housing 110. In the embodiment illustrated in FIG. 3A, the inner housing 120 is cylindrical with a bottom surface 122 and an open top portion. The bottom surface 122 of the inner housing 120 is configured with one or more openings. In various other embodiments, the inner housing 120 does not have the bottom surface 122.

In the embodiment illustrated in FIG. 3A, at least a portion of the inner housing 120 that is cylindrical has a smaller diameter than a portion of the outer housing 110 that is cylindrical. The inner housing 120 is not limited to being cylindrical, but may be of other various shapes including, but not limited to, a three-dimensional ellipse, a three-dimensional twisted ellipse, a three-dimensional rectangular box, or the like. The inner housing 120 may be manufactured with various materials including, but not limited to, one or more of glass, ceramic, metal, plastic, and the like.

The filter member 130 has at least an outer peripheral edge coupled to the inner housing 120, and the filter member 130 is configured to filter the mixture 152 to provide a filtered beverage as the inner housing 120 slides within the outer housing 110. In various embodiments, the filter member 130 is coupled to a bottom portion of the inner housing 120 that is below a middle of the inner housing 120. Also, in various embodiments, the filter member 130 is clipped to the inner housing 120. The filter member 130 may comprise, but is not limited to, a mesh filter, a wire filter, a metal strainer, or the like.

If the inner housing 120 has the bottom surface 122 with one or more openings, such as is illustrated in FIG. 3A, then the filter member 130 may be held next to the bottom surface 122 of the inner housing 120. In FIG. 3A, the filter member 130 is supported by the inner housing 120 next to a bottom side of the bottom surface 122, and portions of the filter member 130 can be seen from a top side of the bottom surface 122 through the plurality of openings in the bottom surface 122.

In various embodiments, the beverage making device 100 further comprises a wiper gasket 142. The wiper gasket 142 may be coupled to an outer peripheral edge of the inner housing 120. In some embodiments, the wiper gasket 142 extends around an entire perimeter of the inner housing 120 on at least a portion of the inner housing 120. In various embodiments, the outer housing 110 and the inner housing 120 are configured with dimensions such that an entire outer surface of the wiper gasket 142 is in contact with the outer housing 110 when the inner housing 120 is placed within the outer housing 110. In the embodiment illustrated in FIG. 3A, the inner housing 120 is cylindrical, and the wiper gasket 142 is coupled to a bottom edge of the inner housing 120.

In various embodiments, the beverage making device 100 further comprises a top gasket 144. The top gasket 144 may be coupled to an outer peripheral edge of the inner housing 120. In some embodiments, the top gasket 144 extends around an entire perimeter of the inner housing 120 on at least a portion of the inner housing 120. In various embodiments, the inner housing 120 and the outer housing 110 are configured with dimensions such that a portion of the top gasket 144 that is coupled to the inner housing 120 contacts the outer housing 110 when the inner housing 120 is placed within the outer housing 110.

In the embodiment illustrated in FIG. 3A, the inner housing 120 is cylindrical, and the top gasket 144 is coupled to a top edge of the inner housing 120. In some embodiments, the top gasket 144 is wider at a top portion of the top gasket 144 than at a bottom portion of the top gasket 144, such that the bottom portion of the top gasket 144 that is coupled to the inner housing 120 fits within the outer housing 110 when the inner housing 120 is placed within the outer housing 110, but the top portion of the top gasket 144 prevents the inner housing 120 from being further slid within the outer housing 110 when the inner housing 120 is placed within the outer housing 110. The top gasket 144 and the wiper gasket 142 may comprise various materials including, but not limited to, rubber and the like.

Figure 3B:
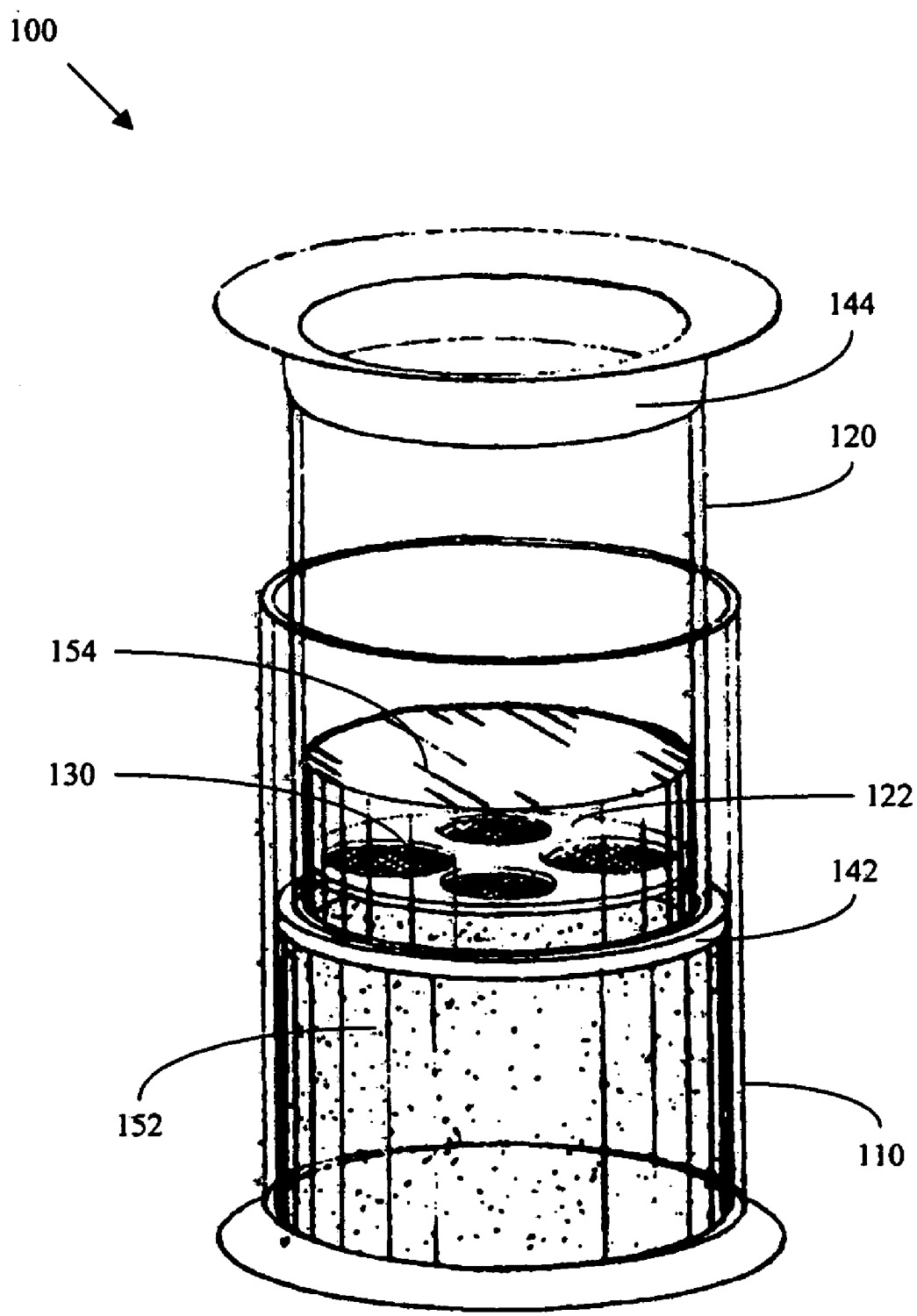
FIG. 3B illustrates a beverage making device in accordance with an embodiment of the present invention when an inner housing is partially compressed into an outer housing.

FIG. 3B illustrates the beverage making device 100 when the inner housing 120 is partially compressed into the outer housing 110. As the inner housing 120 slides within the outer housing 110, the wiper gasket 142 that is coupled to the inner housing 120 has an outer surface that contacts an inner surface of the outer housing 110, such that the wiper gasket 142 substantially prevents the mixture 152 of the liquid and the beverage making material from escaping around an outer side of the inner housing 120. Also, as the inner housing 120 slides within the outer housing 110, the mixture 152 of the liquid and the beverage making material is filtered by the filter member 130 to provide a beverage 154 that passes through the openings in the bottom surface 122 of the inner housing 120 and fills into the inner housing 120. In various embodiments, the inner housing 120 comprises a solid surface for holding the beverage 154.

Thus, when pressure is applied to the inner housing 120, the inner housing 120 may be compressed into the outer housing 110, and the mixture 152 of the liquid and the beverage making material may be filtered by the filter member 130 to provide the beverage 154 that fills into a hollow space within the inner housing 120. In various embodiments, the top gasket 144 may be coupled to a top portion of the inner housing 120 above a middle of the inner housing 120, and may have dimensions such that the top gasket 144 does not contact the outer housing 110 until the inner housing 120 has been almost completely placed within the outer housing 110.

Figure 3C:
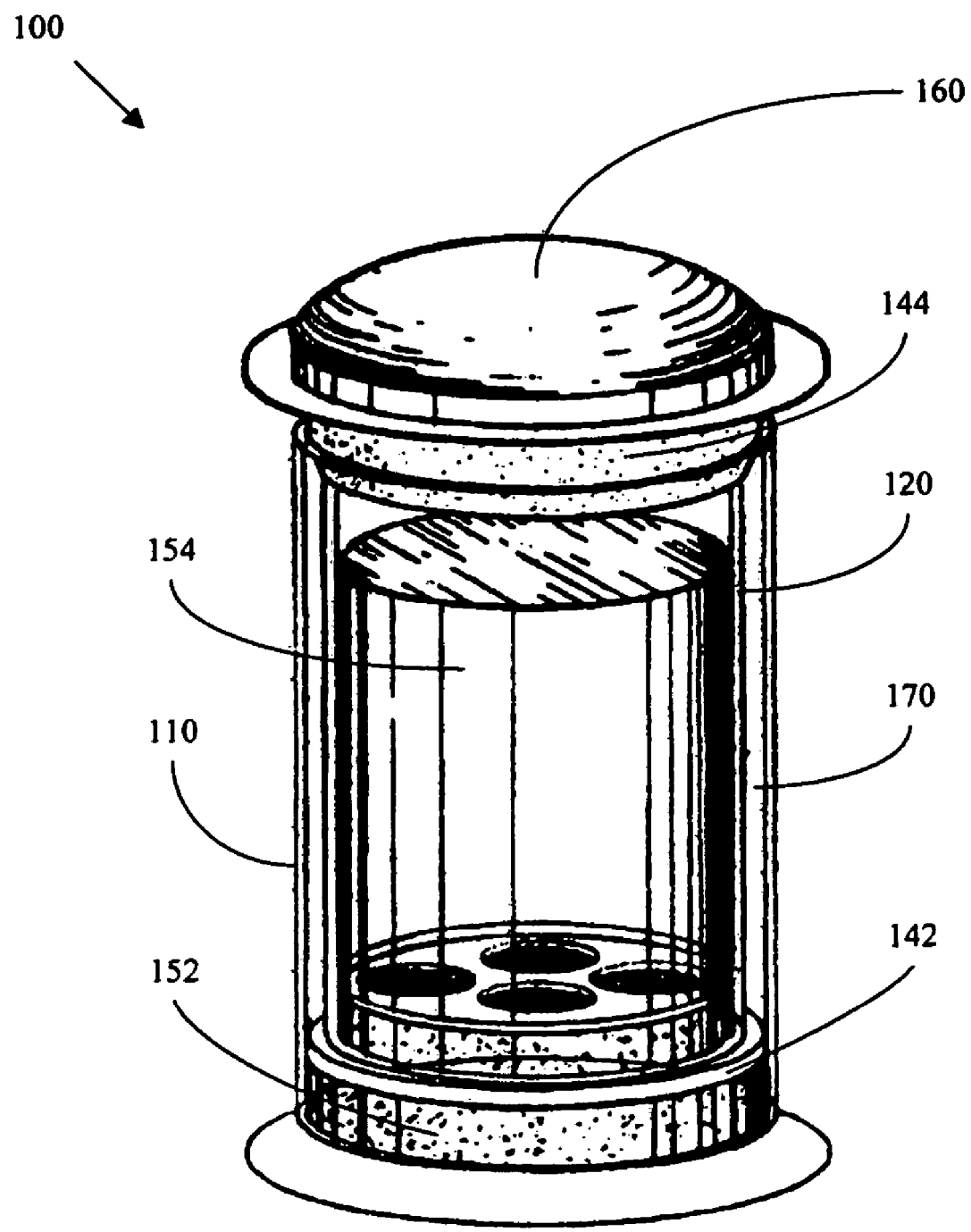
FIG. 3C illustrates a beverage making device in accordance with an embodiment of the present invention when an inner housing is fully compressed into an outer housing.

FIG. 3C illustrates the beverage making device 100 when the inner housing 120 is fully compressed into the outer housing 110. In various embodiments, the top gasket 144 and the inner housing 120 have dimensions such that a top portion of the top gasket 144 that is coupled to the inner housing 120 prevents the inner housing 120 from being further slid within the outer housing 110. Also, in various embodiments, the filter member 130 may be supported next to the bottom surface 122 of the inner housing 120, where the bottom surface 122 of the inner housing 120 is recessed into the inner housing 120 a particular distance from a bottom of a side of the inner housing 120.

As illustrated in FIG. 3C, when the inner housing 120 is fully compressed into the outer housing 110, a residual amount of the mixture 152 of the liquid and the beverage making material still remains at a bottom of the outer housing 110, while most of the mixture 152 has been filtered to provide the beverage 154 that fills into the inner housing 120. In various embodiments, the outer housing 110 and the inner housing 120 are configured with dimensions such that an outer surface of the top gasket 144 and an outer surface of the wiper gasket 142 are in contact with the outer housing 110 when the inner housing 120 is placed within the outer housing 110, and such that an insulating air space 170 exists between the outer housing 110 and the inner housing 120 and between the top gasket 144 and the bottom gasket 142 when the inner housing 120 is placed within the outer housing 110.

Once the beverage 154 has been filtered into the inner housing 120, the beverage 154 can be served by pouring the beverage 154 out of the inner housing 120. In various embodiments, the beverage making device 100 may further comprise a lid 160 that is configured to cover the inner housing 120 when the inner housing 120 is placed within the outer housing 110. The lid 160 may comprise various materials including, but not limited to, one or more of cork, rubber, glass, ceramic, metal, wood, plastic, and the like. Also, in various embodiments, the outer housing 110 may comprise a handle and the inner housing 120 may comprise a spout for aiding in pouring the beverage 154 out of the inner housing 120. In some embodiments, the outer housing 110 comprises a base that is configured to further stabilize the outer housing 110 when the outer housing 110 is placed on a surface.

The beverage making device 100 has many advantages over the related art traditional press pots. By making a distance between an outer surface of the inner housing 120 and an inner surface of the outer housing 110 small when the inner housing 120 is placed within the outer housing 110, it can be more readily assured that the inner housing 120 will be properly aligned within the outer housing 110 than with a central rod plunger. Also, when tolerances between the inner housing 120 and the outer housing 110 are small and the inner housing 120 supports the filter member 130 on at least an outer peripheral edge of the filter member 130, there is less chance for the inner housing 120 to slip sideways and cause the mixture 152 of the liquid and the beverage making material to splatter out of the outer housing 110 than with a central rod plunger. Moreover, by constructing the inner housing 120 with solid walls, even if the mixture 152 escapes around an outer side of the inner housing 120, the filtered beverage 154 would still not be contaminated with unfiltered beverage making material.

In addition, by including the wiper gasket 142 around an outer peripheral surface of the inner housing 120, the wiper gasket 142 may contact an inner surface of the outer housing 110 when the inner housing 120 is placed within the outer housing 110. As a consequence, the wiper gasket 142 may help prevent the inner housing 120 from wiggling inside of the outer housing 110 when pressure is applied to the inner housing 120, and may help prevent the mixture 152 from escaping around an outer side of the inner housing 120 and splattering out of the outer housing 110. Also, the wiper gasket 142 may clean residual beverage making material off of an inner surface of the outer housing 110 as the inner housing 120 slides in and out of the outer housing 110 and, thus, may reduce an amount of effort needed to clean the outer housing 110 after the beverage 154 has been served.

Furthermore, by including the wiper gasket 142 and the top gasket 144 on the inner housing 120, the insulating air space 170 can be provided between the inner housing 120 and the outer housing 110 and between the wiper gasket 142 and the top gasket 144 when the inner housing 120 is placed within the outer housing 110. The insulating air space 170 may enable the beverage 154 that is inside of the inner housing 120 to keep its temperature for an extended period of time as compared with beverages that are in related art press pots that only have a central rod plunger with no insulating air space.

Also, in various embodiments, the inner housing 120 and the outer housing 110 may be fabricated in plastic which, after an initial expense of forming molds, may reduce a cost of production of the beverage making device 100 as compared with related art press pots and, as a consequence, make a retail price more reasonable to consumers. Thus, the beverage making device 100 has many advantages over the related art traditional press pots.

Figure 4:
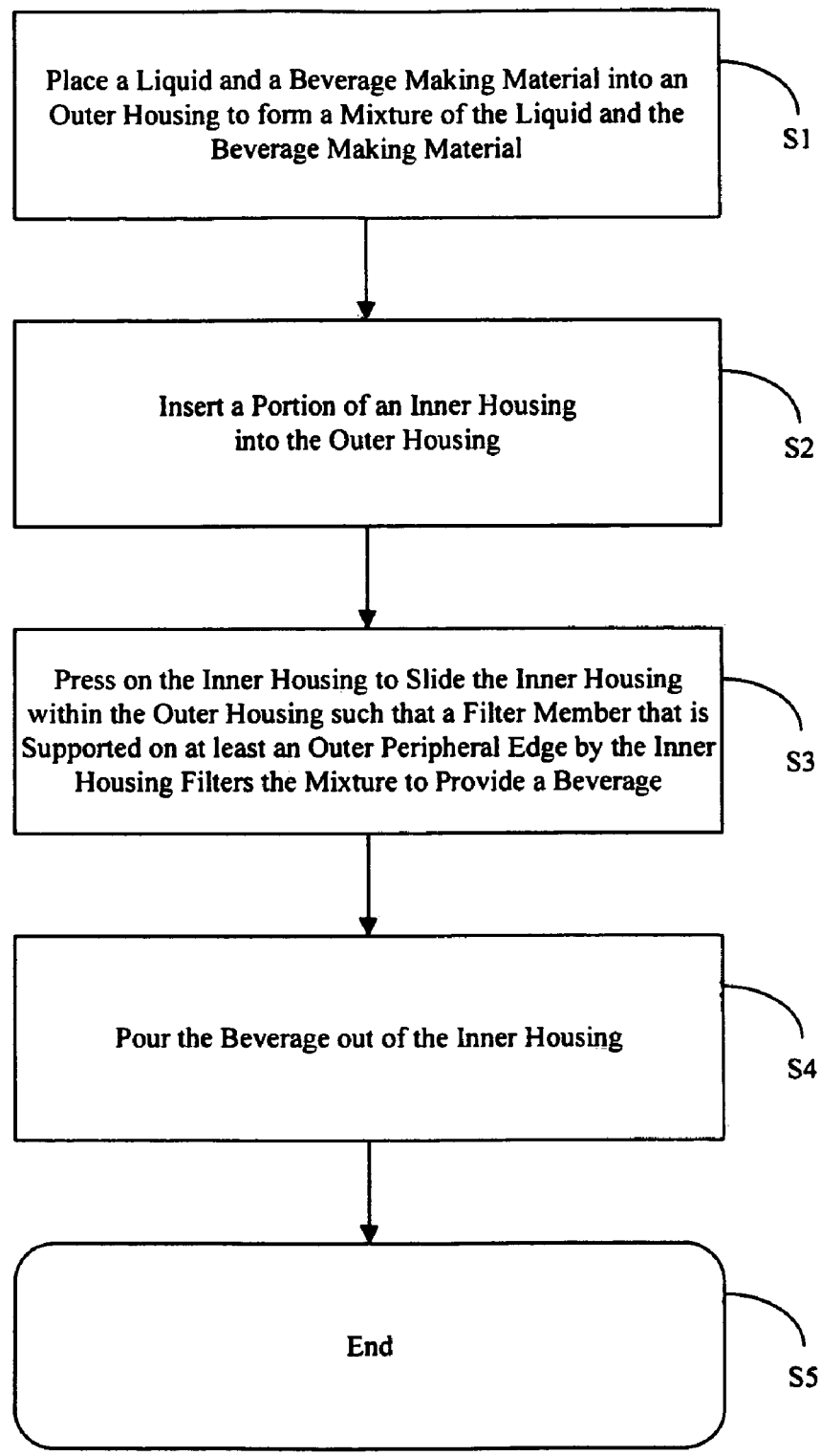
FIG. 4 illustrates a flowchart of a process for making a beverage from a liquid and a beverage making material using a beverage making device in accordance with an embodiment of the present invention.

FIG. 4 illustrates a flowchart of a process for making a beverage from a liquid and a beverage making material using a beverage making device in accordance with an embodiment of the present invention, where the beverage making device comprises an outer housing, an inner housing, and a filter member having at least an outer peripheral edge coupled to the inner housing. The process may be carried out, for example, by a user that is using the beverage making device to make a beverage.

In S1, the liquid and the beverage making material are placed into the outer housing to form a mixture of the liquid and the beverage making material, and the process continues to S2. In S2, a portion of the inner housing is inserted into the outer housing, and the process continues to S3. In S3, the inner housing is pressed on to slide the inner housing within the outer housing such that the filter member that is supported on at least an outer peripheral edge by the inner housing filters the mixture to provide the beverage. The process then continues to S4, in which the beverage is poured out of the inner housing, and then the process ends in S5.

Figure 5A:
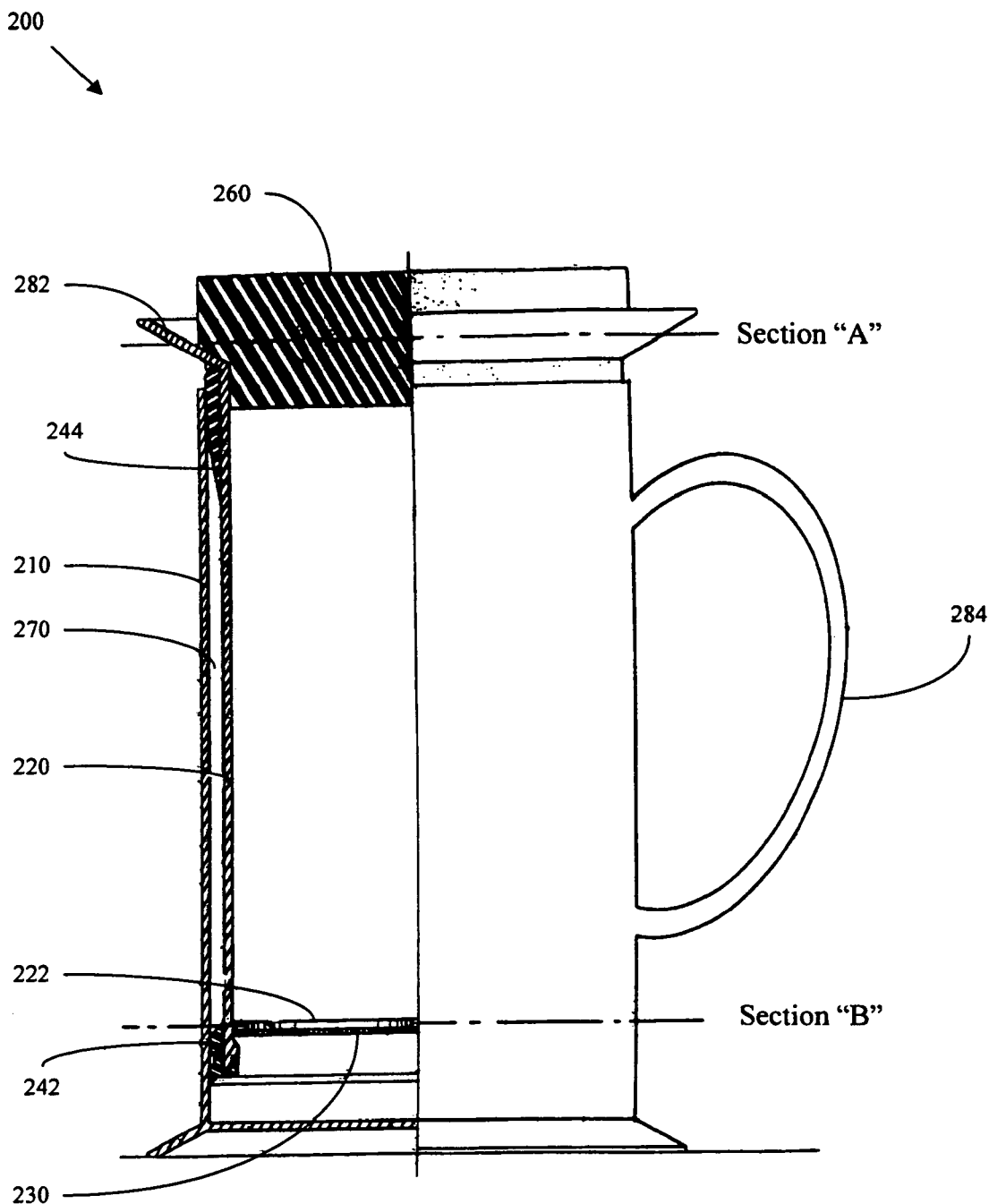
FIG. 5A illustrates a beverage making device in accordance with an embodiment of the present invention.

FIG. 5A illustrates a beverage making device 200 in accordance with an embodiment of the present invention. A right half of the beverage making device 200 is illustrated in FIG. 5A from an external view, and a left half of the beverage making device 200 is illustrated in FIG. 5A as a cross-sectional view of the beverage making device 200. The beverage making device 200 comprises an outer housing 210, an inner housing 220, and a filter member 230.

The outer housing 210 comprises a handle 284. The inner housing 220 comprises a bottom surface 222 and a spout 282. The beverage making device 200 further comprises a wiper gasket 242 coupled to the inner housing 220, a top gasket 244 coupled to the inner housing 220, and a lid 260 with a portion that fits within the inner housing 220. In FIG. 5A, the inner housing 220 is illustrated as having been placed within the outer housing 210, and an insulating air space 270 exists between the inner housing 220 and the outer housing 210 and between the top gasket 244 and the wiper gasket 242. The beverage making device 200 is similar to the beverage making device 100, and like named elements provide similar functions.

The wiper gasket 242 may comprise, for example, rubber or the like. The wiper gasket 242 may be coupled to the inner housing 220 using, for example, a glue, an epoxy, or the like, or may be screwed or nailed to the inner housing 220, or may be clipped to the inner housing 220. In various embodiments, the wiper gasket 242 is coupled to a bottom edge of an outer surface of the inner housing 220 and a portion of the wiper gasket 242 extends around a bottom of the edge of the inner housing 220 to contact an inner surface of the bottom edge of the inner housing 220.

The top gasket 244 may comprise, for example, rubber or the like. The top gasket 244 may be coupled to the inner housing 220 using, for example, a glue, an epoxy, or the like, or may be screwed or nailed to the inner housing 220, or may be clipped to the inner housing 220. In various embodiments, the top gasket 244 is coupled to a top edge of an outer surface of the inner housing 220.

The filter member 230 has at least an outer peripheral edge coupled to the inner housing 220. In various embodiments, the filter member 230 is bendable, and an outer peripheral edge of the filter member 230 is coupled to the inner housing 220 by a tension force of the filter member 230 that causes the outer peripheral edge of the filter member 230 to press against the inner housing 220 to hold the filter member 230 in place. In various other embodiments, the filter member 230 is coupled to the inner housing 220 by, for example, being clipped to the inner housing 220, or by being screwed or nailed to the inner housing 220, or by being glued or taped to the inner housing 220.

In some embodiments, the inner housing 220 comprises protrusions, and the filter member 230 is coupled to the inner housing 220 by having an outer peripheral edge of the filter member 230 be supported on the protrusions of the inner housing 220. The filter member 230 may be further supported by the bottom surface 222 of the inner housing 220 that acts as a cross brace or mesh support for the filter member 230. The bottom surface 222 of the inner housing 220 may be recessed within the inner housing 220. Also, the bottom surface 222 of the inner housing 220 has one or more openings that allow for a filtered beverage to fill into the inner housing 220 after being filtered by the filter member 230.

Figure 5B:
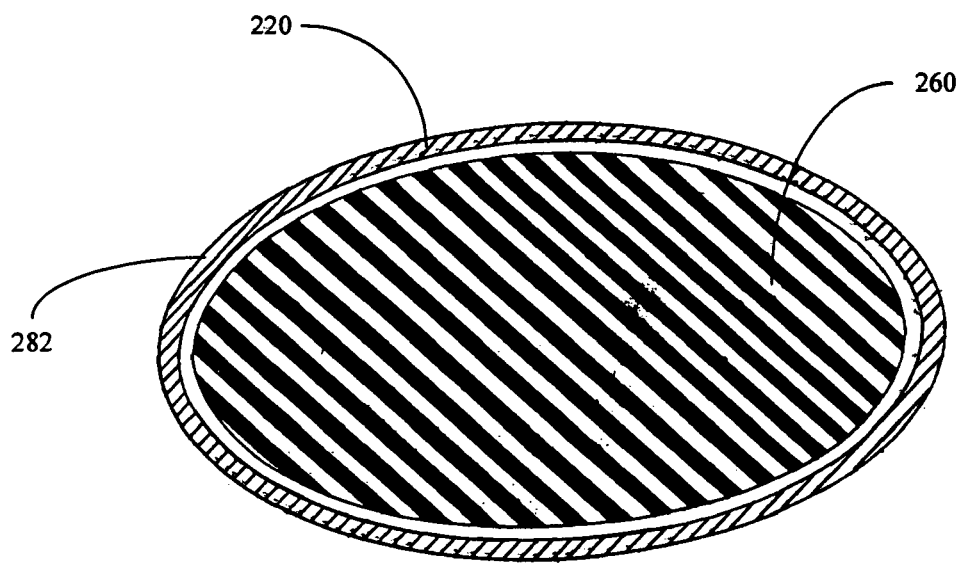
FIG. 5B illustrates a cross-section of a beverage making device taken along section "A" in FIG. 5A in accordance with an embodiment of the present invention.

FIG. 5B illustrates a cross-section of the beverage making device 200 taken along section "A" in FIG. 5A. As illustrated in FIG. 5B, a portion of the lid 260 fits within the inner housing 220. The lid 260 may comprise, for example, one or more of rubber, plastic, glass, wood, cork, metal, ceramic, and the like. The inner housing 220 may comprise the spout 282 that may aid in pouring a beverage out of the inner housing 220.

Figure 5C:
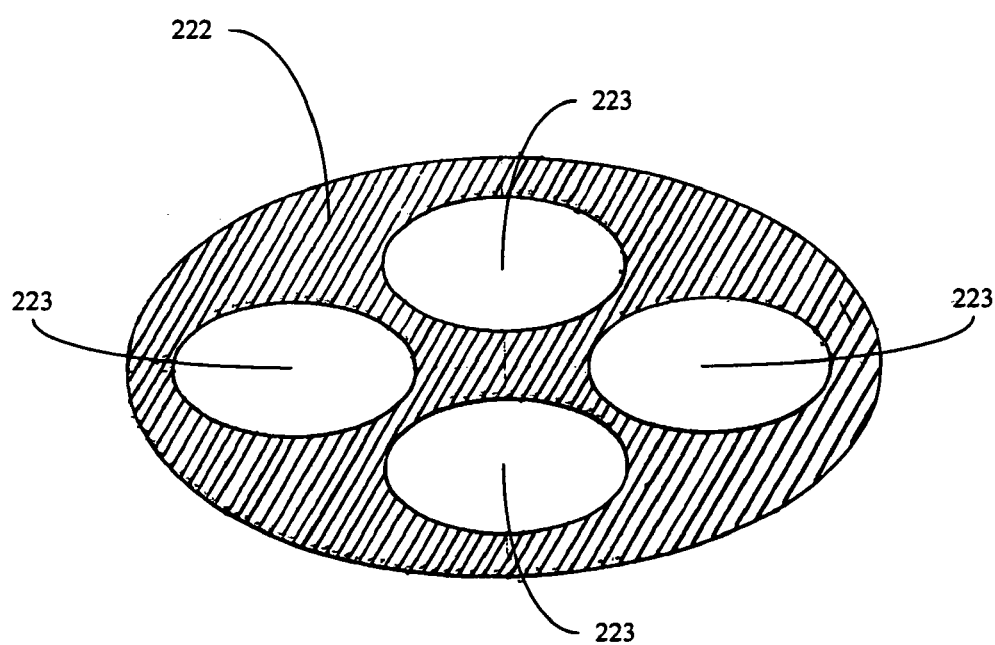
FIG. 5C illustrates a cross-section of a bottom surface of an inner housing of a beverage making device taken along section "B" in FIG. 5A in accordance with an embodiment of the present invention.

FIG. 5C illustrates a cross-section of the bottom surface 222 of the inner housing 220 of the beverage making device 200 taken along section "B" in FIG. 5A. The bottom surface 222 may comprise one or more of glass, ceramic, metal, plastic, or the like. The bottom surface 222 has one or more openings 223 that are holes in the bottom surface 222. The one or more openings 223 allow for a filtered beverage to fill into the inner housing 220 after being filtered by the filter member 230. The one or more openings 223 may be of various shapes and sizes, and may be in various locations within the bottom surface 222. In various embodiments, the filter member 230 is supported by the bottom surface 222.

Figure 6A:
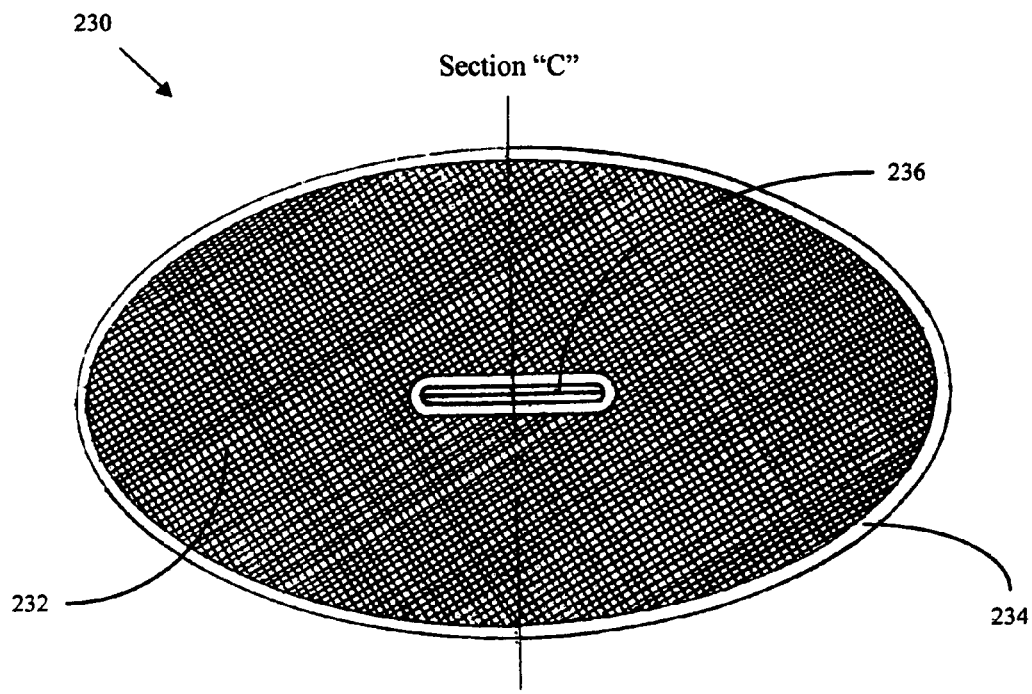
FIG. 6A illustrates a filter member in accordance with an embodiment of the present invention.

FIG. 6A illustrates the filter member 230 in accordance with an embodiment of the present invention. The filter member 230 comprises a filter 232, a reinforcement ring 234, and a pull tab 236. The reinforcement ring 234 and the pull tab 236 are optional, and may be omitted in various embodiments of the filter member 230. The filter 232 may comprise, for example, a wire mesh filter, a metal strainer, or the like, for filtering a mixture of a liquid and a beverage making material to provide a filtered beverage. The reinforcement ring 234 may be coupled to the filter 232 around an outer edge of the filter 232, and the reinforcement ring 234 may comprise, for example, rubber, plastic, or the like. The pull tab 236 allows for making it easier to pull on the filter member 230, and the pull tab may comprise, for example, rubber, plastic, metal, or the like.

Figure 6B:
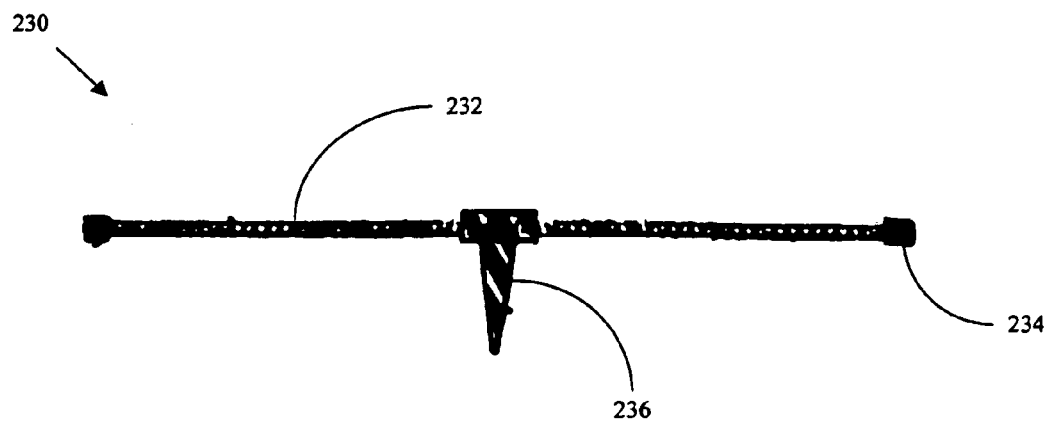
FIG. 6B illustrates a cross-section of a filter member taken along section "C" in FIG. 6A in accordance with an embodiment of the present invention.

FIG. 6B illustrates a cross-section of the filter member 230 taken along section "C" in FIG. 6A. As illustrated in FIG. 6B, the pull tab 236 is connected to the filter 232 and has a protruding portion that extends outward in a direction that is substantially perpendicular to a longitudinal direction of the filter 232. Also, the edges of the filter 232 are illustrated as being reinforced with the reinforcement ring 234.

Figure 7A:
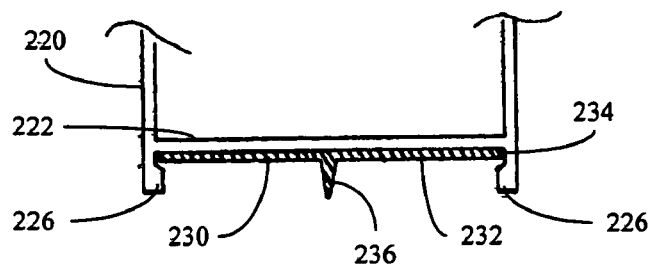
FIG. 7A illustrates a filter member in a fully inserted position and coupled to an inner housing in accordance with an embodiment of the present invention.
Figure 7B:
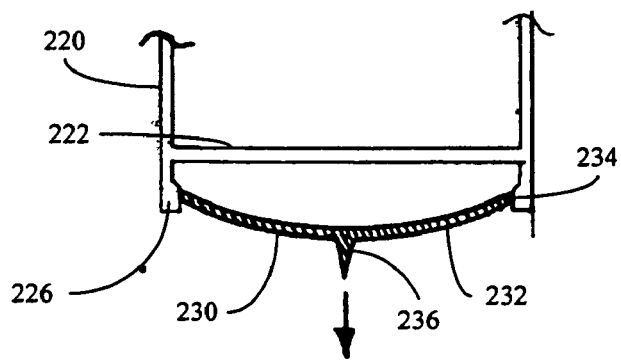
FIG. 7B illustrates a filter member in a partially removed position from an inner housing in accordance with an embodiment of the present invention.
Figure 7C:
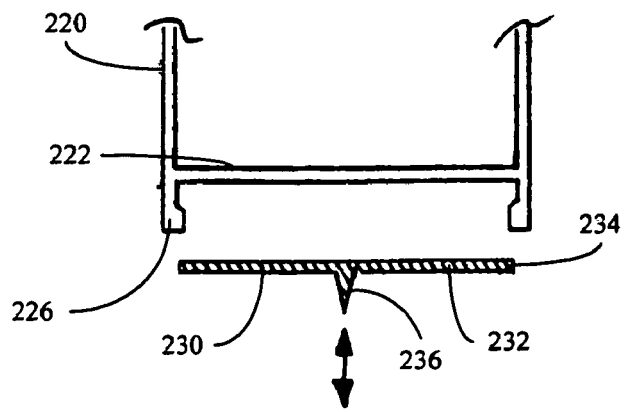
FIG. 7C illustrates a filter member in a fully removed position from an inner housing in accordance with an embodiment of the present invention.

FIGS. 7A, 7B, and 7C illustrate a removal of the filter member 230 from the inner housing 220 in accordance with an embodiment of the present invention. In FIG. 7A, the filter member 230 is in a fully inserted position and is coupled to the inner housing 220. In various embodiments, the filter 232 of the filter member 230 is bendable and exerts a tension force in an outward direction such that the reinforcement ring 234 of the filter member 230 is pressed against an inner surface of the inner housing 220 to hold the filter member 230 in place. Also, the filter member 230 may be supported by the bottom surface 222 of the inner housing 220 and by one or more protrusions 226 that extend from side walls of the inner housing 220 and provide support for the filter member 230. In various embodiments, the filter member 230 has a pull tab 236 that extends from the filter 232 in a direction that is substantially perpendicular to a longitudinal direction of the filter 232.

In FIG. 7B, the filter member 230 is illustrated in a partially removed position from the inner housing 220. When the pull tab 236 is pulled in a direction away from the bottom surface 222 of the inner housing 220, the filter 232 bends such that the reinforcement ring 234 is able to pass around the protrusions 226 of the inner housing 220. In FIG. 7C, the filter member 230 is illustrated in a fully removed position from the inner housing 220. Once the pull tab 236 has been sufficiently pulled to pass the reinforcement ring 234 past the protrusions 226 of the inner housing 220, the filter member 230 is fully removed from the inner housing 220 and the filter 232 may stretch out. Once the filter member 230 has been removed from the inner housing 220, the filter member 230 may be easily washed and cleaned. Then, the filter member 230 can be reinserted into the inner housing 220 by bending the filter member 230 to place the reinforcement ring 234 between the protrusions 226 and the bottom surface 222 of the inner housing 220 and then allowing the filter 232 to stretch out.

Figure 8:
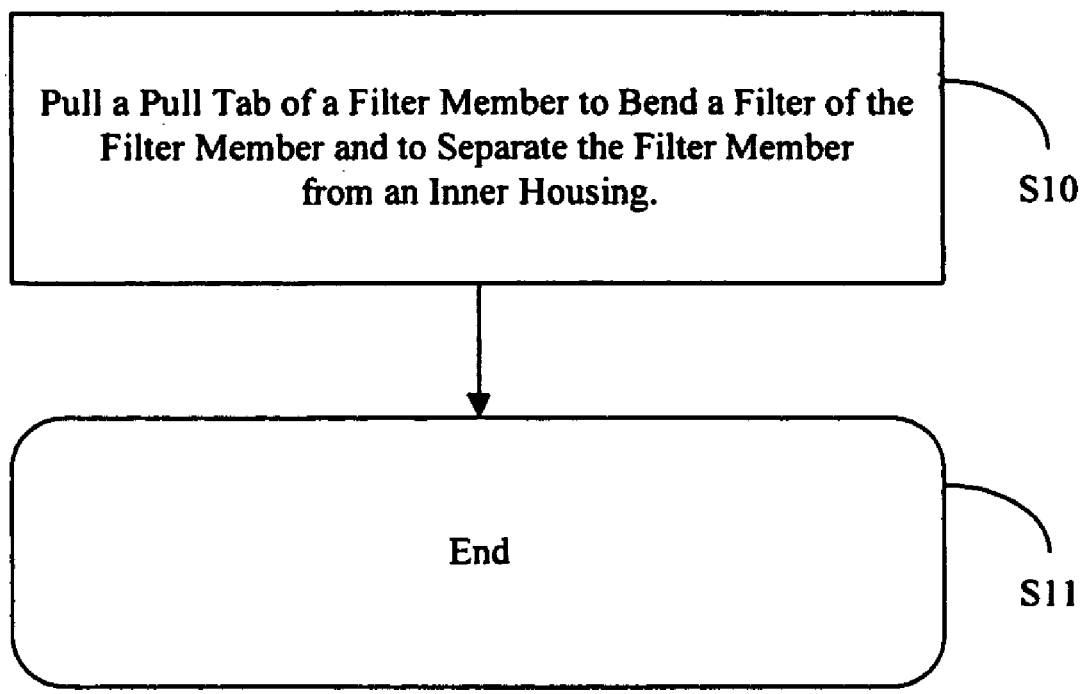
FIG. 8 illustrates a flowchart of a process for removing a filter member from an inner housing in accordance with an embodiment of the present invention.

FIG. 8 illustrates a flowchart of a process for removing a filter member from an inner housing in accordance with an embodiment of the present invention. In S10, a pull tab of a filter member is pulled to bend a filter of the filter member and to separate the filter member from the inner housing. The process then ends in S11. Such a process allows for easily removing a filter member from an inner housing so that, for example, a filter of the filter member can be easily cleaned and then the filter member can be reinserted within the inner housing.

Figure 9:
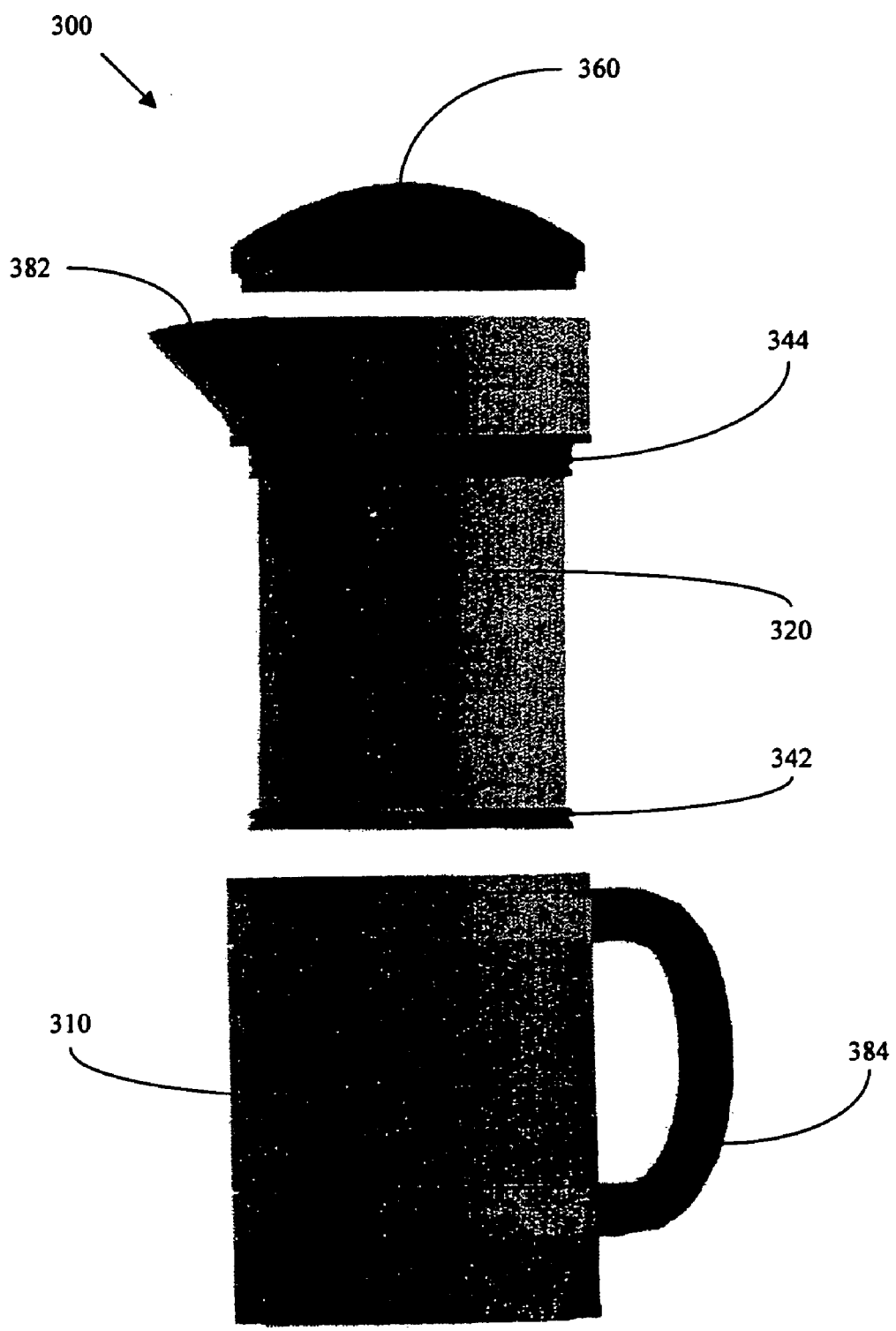
FIG. 9 illustrates an external view of a beverage making device in accordance with an embodiment of the present invention.

FIG. 9 illustrates an external view of a beverage making device 300 in accordance with an embodiment of the present invention. The beverage making device 300 comprises an outer housing 310, an inner housing 320, and a filter member (not shown). The outer housing 310 is configured to hold a mixture of a liquid and a beverage making material, and the outer housing 310 has an open top portion and a closed bottom portion. The inner housing 320 is adapted to be received within the outer housing 310 and is adapted to slide within the outer housing 310.

In various embodiments, the outer housing 310 comprises a handle 384. Also, in various embodiments, the inner housing 320 comprises a spout 382 for aiding in pouring a filtered beverage out of the inner housing 320. In some embodiments, the beverage making device 300 further comprises a lid 360 for covering the inner housing 320. In various embodiments, the beverage making device 300 further comprises a wiper gasket 342 coupled to at least an outer peripheral edge of a bottom portion of the inner housing 320, and further comprises a top gasket 344 coupled to at least an outer peripheral edge of a top portion of the inner housing 320.

Figure 10:
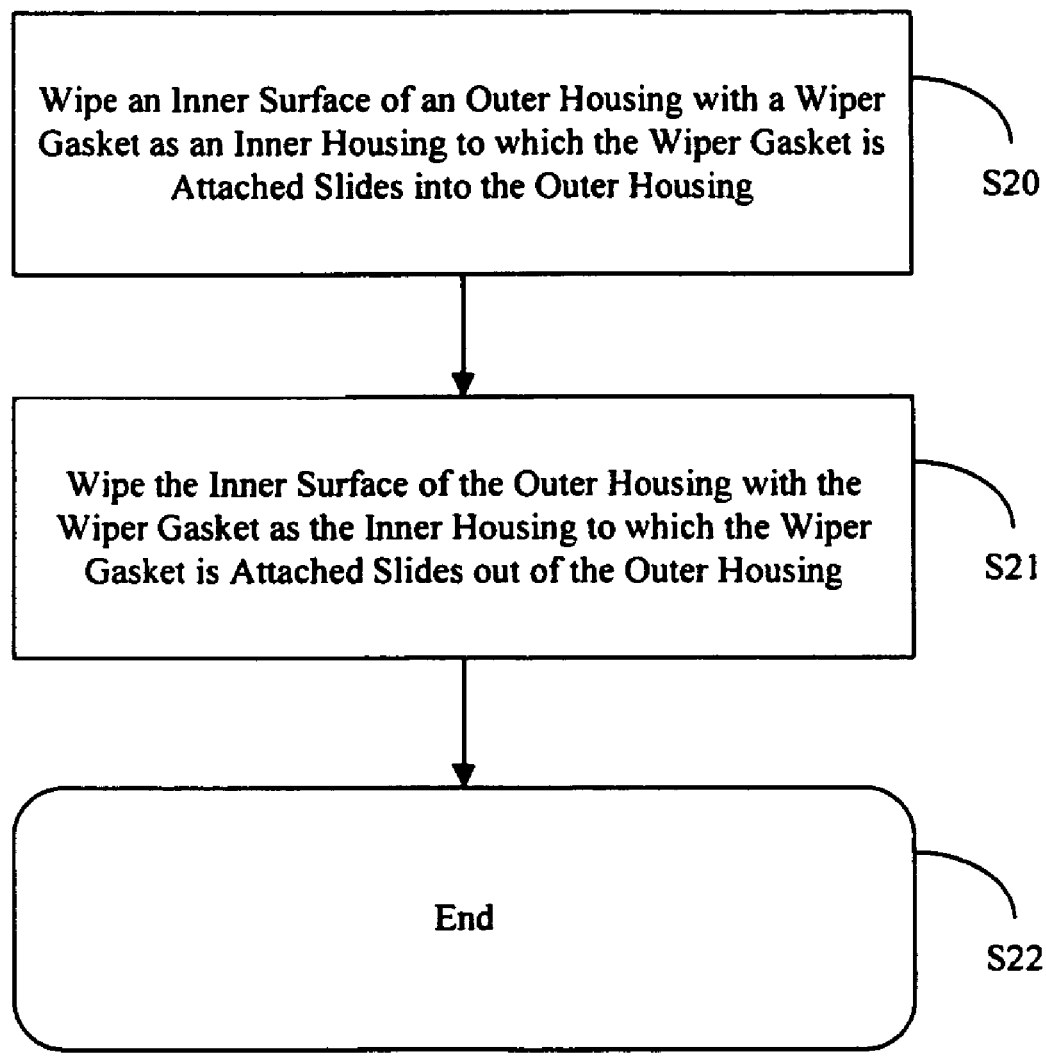
FIG. 10 illustrates a flowchart of a process for wiping an inner surface of an outer housing with a wiper gasket in accordance with an embodiment of the present invention.

FIG. 10 illustrates a flowchart of a process for wiping an inner surface of an outer housing with a wiper gasket in accordance with an embodiment of the present invention. In S20, an inner surface of an outer housing is wiped with a wiper gasket as an inner housing to which the wiper gasket is attached slides into the outer housing. The process then continues to S21. In S21, an inner surface of the outer housing is wiped with the wiper gasket as the inner housing to which the wiper gasket is attached slides out of the outer housing. The process then ends in S22.

Figure 11:
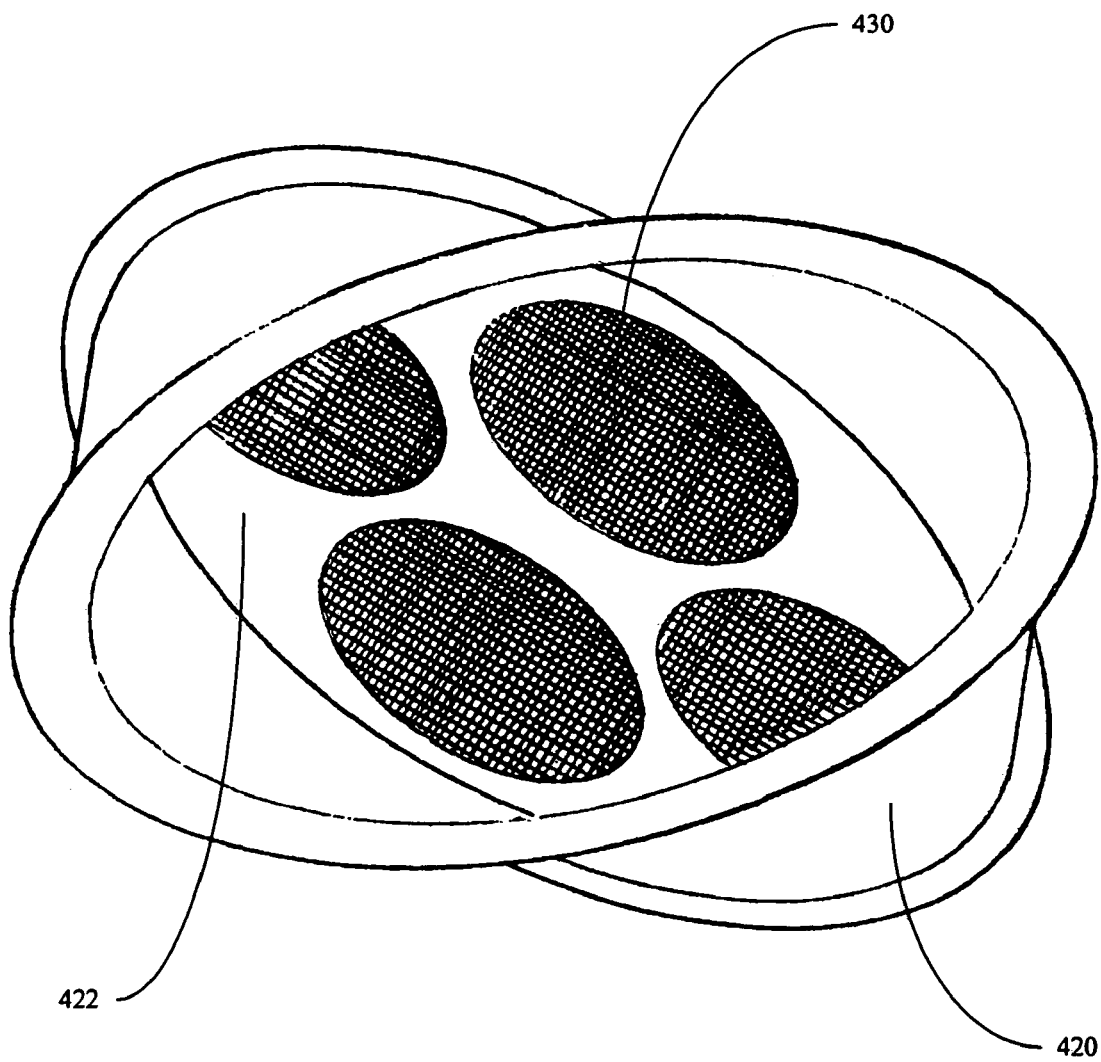
FIG. 11 illustrates a top view of an inner housing in a shape of a three-dimensional twisted ellipse in accordance with an embodiment of the present invention.

FIG. 11 illustrates a top view of an inner housing 420 in a shape of a three-dimensional twisted ellipse in accordance with an embodiment of the present invention. The inner housing 420 has a bottom surface 422 with a plurality of openings. A filter member 430 is supported by the inner housing 420 next to a bottom side of the bottom surface 422, and portions of the filter member 430 are seen from the top view of the inner housing 420 through the openings in the bottom surface 422 of the inner housing 420.

Figure 12:
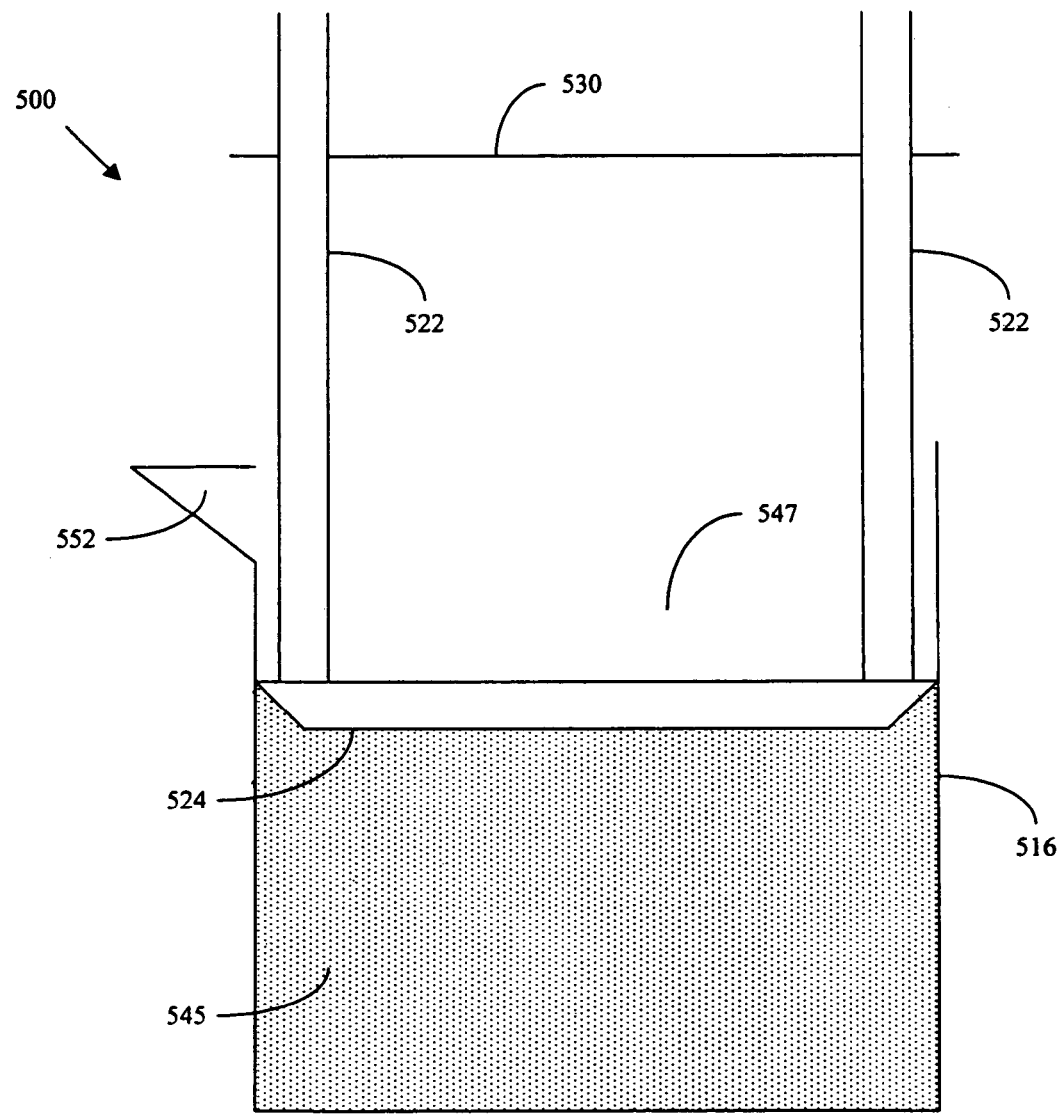
FIG. 12 illustrates a beverage making device in accordance with an embodiment of the present invention.

FIG. 12 illustrates a beverage making device 500 in accordance with an embodiment of the present invention. The beverage making device 500 comprises a container 516, a filter 524, and a plurality of rods 522. In various embodiments, the beverage making device 500 further comprises a lid 530 that connects the plurality of rods 522. Also, in various embodiments, the container 516 comprises a spout 552.

The container 516 is configured to hold a mixture 545 of a liquid and a beverage making material. The filter 524 is configured to filter the mixture 545 to provide a filtered beverage 547. The plurality of rods 522 are connected to the filter 524 and allow for sliding the filter 524 within the container 516. At least one rod of the plurality of rods 522 is connected to the filter 524 in a location that is closer to an edge of the filter 524 than to a center of the filter 524. By connecting a plurality of rods 522 to the filter 524, and by connecting at least one rod of the plurality of rods 522 to the filter 524 in a location that is closer to an edge of the filter 524 than to a center of the filter 524, the filter 524 may remain better aligned with the container 516 when the filter 524 is compressed within the container 516 than with the central rod configurations of the related art press pots.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A beverage making device for making a beverage from a liquid and a beverage making material, said beverage making device comprising:
    an outer housing for holding a mixture of said liquid and said beverage making material;
    an inner housing configured to be received within said outer housing and configured to slide within said outer housing; and
    a filter member having at least an outer peripheral edge coupled to said inner housing, said filter member configured to filter said mixture to provide said beverage as said inner housing slides within said outer housing;
    wherein said inner housing has a bottom surface that is configured with one or more openings;
    wherein said filter member is held next to said bottom surface of said inner housing;
    wherein said filter member comprises a bendable filter, said bendable filter having a pull tab; and
    wherein said filter member is configured to be detached from said inner housing when said pull tab is pulled.

2. The beverage making device of claim 1,
    wherein said filter member comprises a mesh filter.

3. The beverage making device of claim 1, further comprising:
    a wiper gasket coupled to an outer peripheral edge of said inner housing.

4. The beverage making device of claim 3,
    wherein said wiper gasket extends around an entire perimeter of said inner housing on at least a portion of said inner housing; and
    wherein said outer housing and said inner housing are configured with dimensions such that an entire outer surface of said wiper gasket that extends around said entire perimeter of said inner housing is in contact with said outer housing when said inner housing is placed within said outer housing.

5. The beverage making device of claim 3,
    wherein said inner housing is cylindrical; and
    wherein said wiper gasket is coupled to a bottom edge of said inner housing.

6. The beverage making device of claim 1, further comprising:
    a lid configured to cover said inner housing when said inner housing is placed within said outer housing.

7. The beverage making device of claim 1,
    wherein said inner housing comprises solid walls for holding said beverage.

8. The beverage making device of claim 1, further comprising:
    a top gasket coupled to an outer peripheral edge of a top portion of said inner housing; and
    a wiper gasket coupled to an outer peripheral edge of a bottom portion of said inner housing;
    wherein said outer housing and said inner housing are configured with dimensions such that an outer surface of said top gasket and an outer surface of said wiper gasket are in contact with said outer housing when said inner housing is placed within said outer housing, and such that an air space exists between said outer housing and said inner housing and between said top gasket and said wiper gasket when said inner housing is placed within said outer housing.

9. The beverage making device of claim 1,
    wherein said outer housing comprises plastic; and
    wherein said inner housing comprises plastic.

10. The beverage making device of claim 1,
    wherein said outer housing comprises at least one of glass, ceramic, metal, and plastic; and
    wherein said inner housing comprises at least one of glass, ceramic, metal, and plastic.

11. A method for making a beverage from a liquid and a beverage making material using a beverage making device, said beverage making device comprising an outer housing, an inner housing, and a filter member having at least an outer peripheral edge coupled to said inner housing, said method comprising:
    placing said liquid and said beverage making material into said outer housing to form a mixture of said liquid and said beverage making material;
    inserting a portion of said inner housing into said outer housing; and
    pressing on said inner housing to slide said inner housing down within said outer housing such that said filter member filters said mixture to provide said beverage;
    wherein said inner housing comprises a protrusion for supporting said outer peripheral edge of said filter member;
    wherein said filter member comprises a bendable filter having a pull tab; and
    wherein the method further comprises pulling said pull tab of said filter member to separate said filter member from said inner housing.

12. The method of claim 11, further comprising:
    pouring said beverage out of said inner housing.

13. The method of claim 11,
    wherein said beverage making device further comprises a wiper gasket coupled to an outer peripheral edge of said inner housing; and
    wherein the method further comprises:
        sliding said inner housing out of said outer housing, said wiper gasket wiping an inner surface of said outer housing as said inner housing slides out of said outer housing.

* * * * *